United States Patent
Gu et al.

(10) Patent No.: US 11,907,729 B2
(45) Date of Patent: Feb. 20, 2024

(54) COMPUTER SYSTEM AND BOOTING METHOD THEREOF

(71) Applicant: ASUSTEK COMPUTER INC., Taipei (TW)

(72) Inventors: Yu Gu, Taipei (TW); Hung-Hsuan Chen, Taipei (TW); Bing-Min Lin, Taipei (TW)

(73) Assignee: ASUSTEK COMPUTER INC, Taipei (TW)

( * ) Notice: Subject to any disclaimer, the term of this patent is extended or adjusted under 35 U.S.C. 154(b) by 0 days.

(21) Appl. No.: 17/843,256

(22) Filed: Jun. 17, 2022

(65) Prior Publication Data

US 2023/0153118 A1 May 18, 2023

(30) Foreign Application Priority Data

Nov. 15, 2021 (TW) ................................. 110142430

(51) Int. Cl.
*G06F 9/4401* (2018.01)

(52) U.S. Cl.
CPC ................................. *G06F 9/4401* (2013.01)

(58) Field of Classification Search
CPC ................................. G06F 9/4401; G06F 9/04
See application file for complete search history.

(56) References Cited

U.S. PATENT DOCUMENTS

| 7,822,964 | B2 | 10/2010 | Sip | |
|---|---|---|---|---|
| 2010/0095044 | A1 | 4/2010 | Cho | |
| 2014/0289504 | A1 | 9/2014 | Wu | |
| 2018/0228238 | A1* | 8/2018 | Gansauskas | A42B 3/0433 |
| 2018/0329716 | A1* | 11/2018 | Jiang | G06F 13/4282 |
| 2021/0124594 | A1* | 4/2021 | Rajagopal | G06F 9/4403 |
| 2021/0247986 | A1* | 8/2021 | Lai | G06F 9/4401 |

FOREIGN PATENT DOCUMENTS

| CN | 101093446 A | 12/2007 |
|---|---|---|
| CN | 101526901 B | 12/2012 |
| CN | 109739570 A | 5/2019 |
| CN | 111538539 A | 8/2020 |
| TW | 201224744 A | 6/2012 |
| TW | 201439820 A | 10/2014 |

* cited by examiner

*Primary Examiner* — Paul Yen
(74) *Attorney, Agent, or Firm* — MUNCY, GEISSLER, OLDS & LOWE, P.C.

(57) ABSTRACT

A booting method is provided, applied to a computer system. The computer system includes a transmission interface, a power key, and a trigger element. The transmission interface includes a transmission specification and is electrically connected to a graphics card, and the power key is used for driving the computer system to perform a booting procedure. The booting method includes: detecting, in the booting procedure, whether the trigger element is triggered or not; and lowering the transmission specification and restarting the computer system when the trigger element is triggered. A computer system adopting the booting method is further provided.

9 Claims, 4 Drawing Sheets

COMPUTER SYSTEM AND BOOTING METHOD THEREOF

CROSS-REFERENCE TO RELATED APPLICATIONS

This application claims the priority benefit of Taiwan application serial No. 110142430, filed on Nov. 15, 2021. The entirety of the above-mentioned patent application is hereby incorporated by reference herein and made a part of the specification.

BACKGROUND OF THE INVENTION

Field of the Invention

The disclosure relates to a computer system, and in particular, to a booting method of the computer system.

Description of the Related Art

When a graphics card is installed on a mainboard of a conventional computer system, signal attenuation is easily caused because a connection interface between the mainboard and the graphics card is unstable or an extension cord is used. Consequently, there is no image displayed on a display.

To resolve the problem, a user changes a connection manner between the graphics card and the mainboard, or enters a basic input/output system (BIOS) to modify settings of the graphics card. However, these operations are quite complex, and it is difficult for the user to enter the BIOS to modify the settings when the display fails to display.

BRIEF SUMMARY OF THE INVENTION

The disclosure provides a booting method, applied to a computer system. The computer system includes a transmission interface, a power key, and a trigger element. The transmission interface includes a transmission specification and is electrically connected to a graphics card, and the power key is used for driving the computer system to perform a booting procedure. The booting method includes: detecting, in the booting procedure, whether the trigger element is triggered or not; and lowering the transmission specification and restarting the computer system when the trigger element is triggered.

The disclosure further provides a computer system. The computer system includes a mainboard, a trigger element, and a power key. The mainboard includes a transmission interface. The transmission interface includes a transmission specification and is electrically connected to a graphics card. The trigger element is electrically connected to the mainboard. The power key is electrically connected to the mainboard, and is used for driving the computer system to perform a booting procedure. The mainboard detects, in the booting procedure, whether the trigger element is triggered or not, and lowers the transmission specification and restarts when the trigger element is triggered.

By using the computer system and the booting method thereof provided in the disclosure, when there is no image displayed on a display, a user presses the trigger element to display the graphics card normally, thereby facilitating simplification of a debugging procedure of the user when the display fails to display normally.

DETAILED DESCRIPTION OF THE EMBODIMENTS

More detailed descriptions of specific embodiments of the disclosure are provided below with reference to the schematic diagrams. The advantages and features of the disclosure are described more clearly according to the following descriptions and claims. It should be noted that all of the drawings use very simplified forms and imprecise proportions, only being used for assisting in conveniently and clearly explaining the objective of the embodiments of the disclosure.

Figure 1:
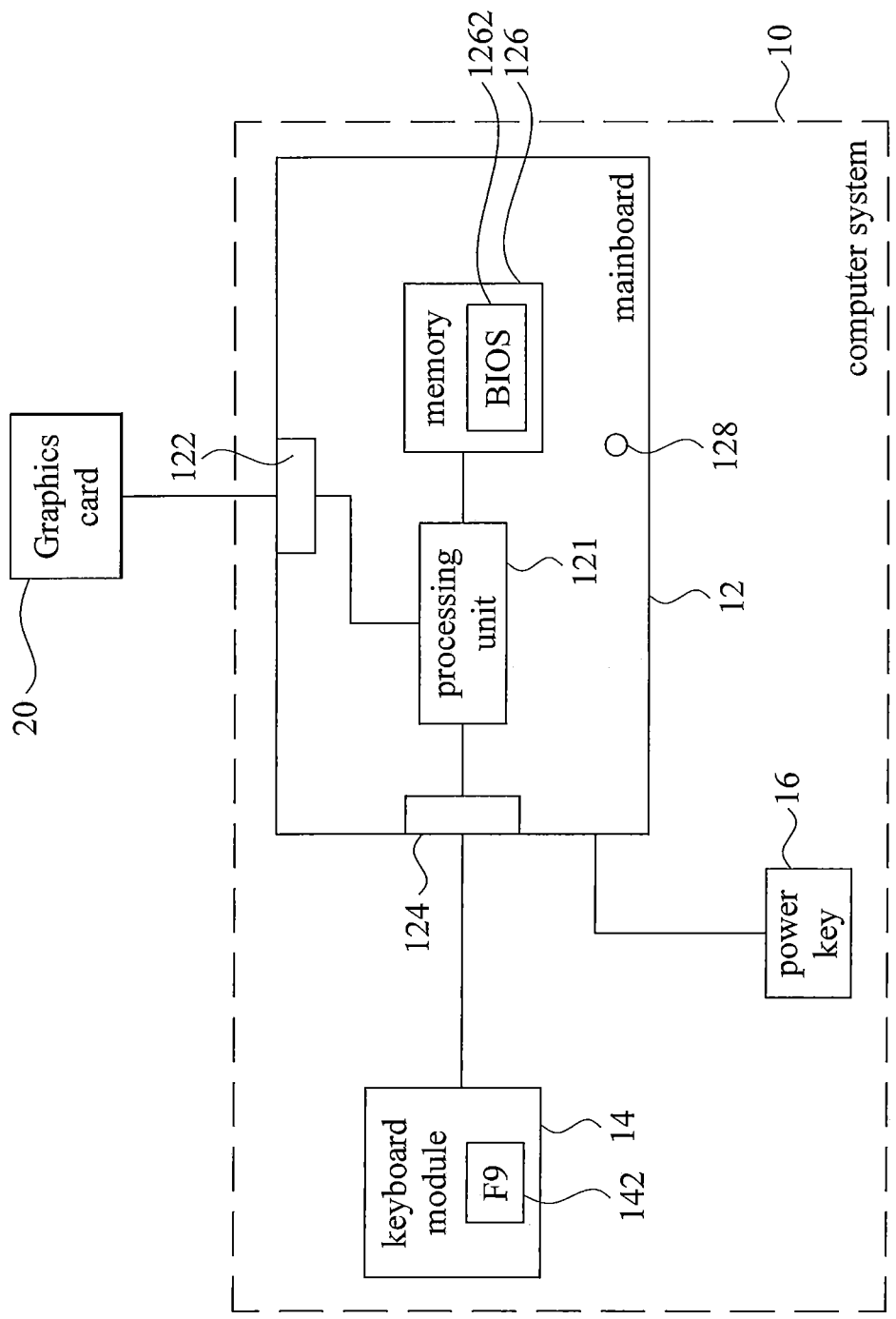
FIG. 1 is a schematic block diagram of an embodiment of a computer system according to the disclosure.

FIG. 1 is a schematic block diagram of an embodiment of a computer system according to the disclosure. The computer system 10 is a computer host, or a notebook computer, or another electronic device in which a graphics card is installed for a user to operate.

As shown in the figure, the computer system 10 includes a mainboard 12, a keyboard module 14, and a power key 16.

The mainboard 12 includes a processing unit 121, a transmission interface 122, an input interface 124, and a memory 126. In an embodiment, the processing unit 121 is a central processing unit (CPU). The transmission interface 122 is configured to be electrically connected to a graphics card 20. The input interface 124 is configured to be connected to the keyboard module 14. A basic input/output system (BIOS) 1262 is stored inside the memory 126. The processing unit 121 is electrically connected to the transmission interface 122, the input interface 124, and the memory 126.

In an embodiment, the transmission interface 122 is a PCI-E interface. A transmission specification of the transmission interface 122 is a transmission specification under a PCI-E standard, such as PCI-E 5.0, PCI-E 4.0, or PCI-E 3.0. In an embodiment, the input interface 124 is a universal serial bus (USB) interface. The memory 126 is an erasable programmable read only memory (EPROM) or another read only memory still remaining a record after a power outage.

The keyboard module 14 is electrically connected to the mainboard 12, to function as a user to control the input interface of the computer system 10. In an embodiment, the keyboard module 14 includes a trigger element 142, and the trigger element 142 is a functional key such as a functional key F9 that is not given a specific function for a booting procedure.

In an embodiment, the trigger element 142 is a switch, or a jumper, or another electronic element that produces a variety of different outputs. The switch is a push-button switch, a multi-section switch, a toggle switch, a membrane switch, or the like. In addition to being disposed on the keyboard module 14, the trigger element 142 is alternatively disposed on the mainboard 12 or another input interface, or is disposed independently.

In an embodiment, the trigger element 142 further provides an auxiliary function by being used with a piezoelectric element, a light-emitting element, a vibration element, a sound-emitting element, or the like. In an embodiment, when the trigger element 142 is triggered, a ray of light is emitted through the light-emitting element, to prompt a successful trigger to a user.

The power key 16 is electrically connected to the mainboard 12, and is configured to be connected to a power supply, to cause the computer system 10 to perform the booting procedure. In an embodiment, the power key 16 is an independent key.

After the booting procedure is started, the processing unit 121 of the mainboard 12 loads the BIOS 1262 first, and detects whether the trigger element 142 is triggered or not through the input interface 124. When it is detected in the booting procedure that the trigger element 142 is triggered, the processing unit 121 of the mainboard 12 lowers the transmission specification of the transmission interface 122 and restarts.

In an embodiment, if the transmission interface 122 is a PCI-E interface and supports a highest transmission specification of PCI-E 4.0, the mainboard 12 lowers the transmission specification of the transmission interface 122 from PCI-E 4.0 to PCI-E 3.0 when the trigger element 142 is triggered.

In another embodiment, if the transmission interface 122 is a PCI-E interface and supports a highest transmission specification of PCI-E 5.0, the mainboard 12 lowers the transmission specification of the transmission interface 122 from PCI-E 5.0 to PCI-E 4.0, or PCI-E 3.0, or PCI-E 2.0 when the trigger element 142 is triggered.

In addition to lowering the transmission specification, the mainboard 12 alternatively lowers a data transmission rate, or a bandwidth, or the number of channels of the transmission interface 122 when the trigger element 122 is triggered.

In an embodiment, the user presses the power key 16 to cause the computer system 10 to start to perform the booting procedure. In another embodiment, a specific key of the keyboard module 14 is pressed, or the computer system 10 is controlled by a software program to start the booting procedure.

The transmission specification of the transmission interface 122 is recorded in the BIOS 1262. In an embodiment, if the transmission interface 122 is a PCI-E interface and supports a highest transmission specification of PCI-E 4.0, all transmission specifications that are supported downward and below PCI-E 4.0 are recorded in the BIOS 1262.

In an embodiment, current settings of the transmission specification of the transmission interface 122 are recorded in the BIOS 1262. When the trigger element 142 is triggered, the settings of the transmission specification of the transmission interface 122 in the BIOS 1262 are modified, and then the booting procedure is continued according to the modified transmission specification. Due to characteristics of the memory 126, the modified transmission specification remains even if the computer system 10 is powered off.

In an embodiment, to help the user to determine a running state of the booting procedure, a time point at which the trigger element 142 is pressed to reduce the transmission specification is learned. The mainboard 12 further includes an indicator light 128. The indicator light 128 indicates a current state of the computer system 10 using a signal, for example, the computer system 10 is in the booting procedure, or the computer system 10 fails to boot, or the computer system 10 completes the booting procedure.

Figure 2:
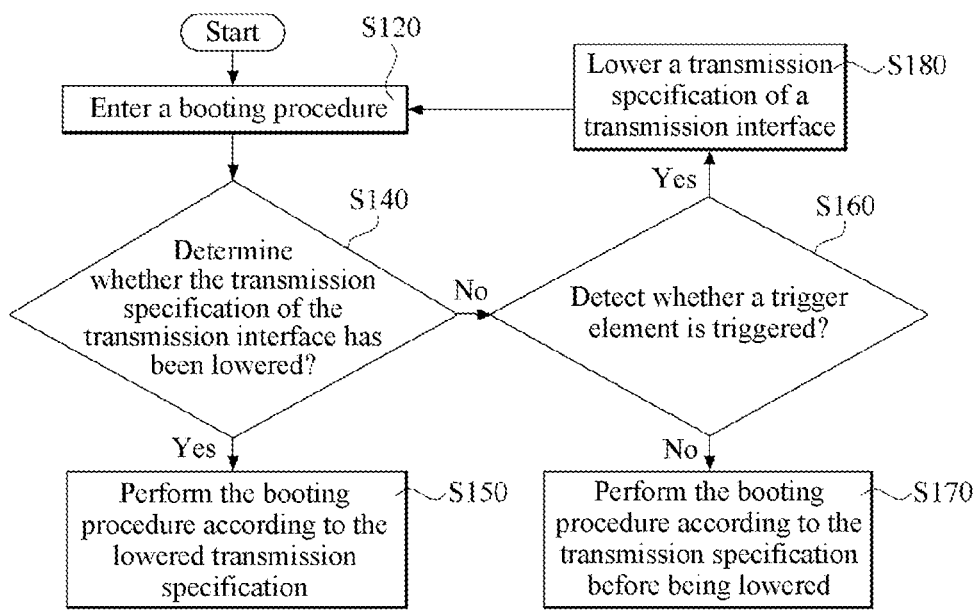
FIG. 2 is a flowchart of an embodiment of a booting method according to the disclosure.

FIG. 2 is a flowchart of an embodiment of a booting method according to the disclosure. The booting method is applicable to the computer system 10 shown in FIG. 1.

First, as described in step S120, the booting procedure is entered. In this step, the user presses the power key 16 to cause the computer system 10 to start the booting procedure. In another embodiment, a specific key of the keyboard module 14 is pressed, or the computer system 10 is controlled by a software program to start the booting procedure.

Then, as described in step S140, whether the transmission specification of the transmission interface 122 has been lowered or not is determined. In other words, in this step, whether the transmission interface 122 is set to transmit by a highest transmission specification or not is determined. In an embodiment, in step S140, whether the transmission specification of the transmission interface 122 has been lowered to a secondary or lower transmission specification or not is determined by the processing unit 121 of the mainboard 12 through the BIOS 1262 of the mainboard 12.

When the transmission specification of the transmission interface 122 has been lowered, this process goes to step S150 of continuing the booting procedure according to the lowered transmission specification.

When the transmission specification of the transmission interface 122 has not been lowered, this process goes to step S160 of detecting whether the trigger element 142 is detected or not. In an embodiment, in step S160, whether the trigger element 142 on the keyboard module 14 is triggered or not is determined by the processing unit 121 of the mainboard 12 through the input interface 124.

When the trigger element 142 is not triggered, this process goes to step S170 of performing the booting procedure according to the transmission specification before being lowered.

When the trigger element 142 is triggered, this process goes to step S180 of lowering the transmission specification of the transmission interface 122. Then, this process goes back to step S120 of reentering the booting procedure according to the settings in the BIOS 1262 after the transmission specification is lowered. Step S180 is performed by the processing unit 121 of the mainboard 12.

In an embodiment, in step S180, the transmission specification of the transmission interface 122 is lowered to the secondary transmission specification from the highest transmission specification supported by the transmission interface 122. In an embodiment, if the transmission interface 122 is a PCI-E interface and supports a highest transmission specification of PCI-E 4.0, in step S180, the transmission specification of the transmission interface 122 is lowered from PCI-E 4.0 to PCI-E 3.0. In an embodiment, in step S180, the transmission specification of the transmission interface 122 is lowered downward by one level from the current setting.

It should be noted that, step S160 needs to be performed in the booting procedure of the computer system 10. If the trigger element 142 is still not triggered after the booting procedure is completed, this process goes to step S170 of performing the booting procedure according to the transmission specification before being lowered.

Figure 3:
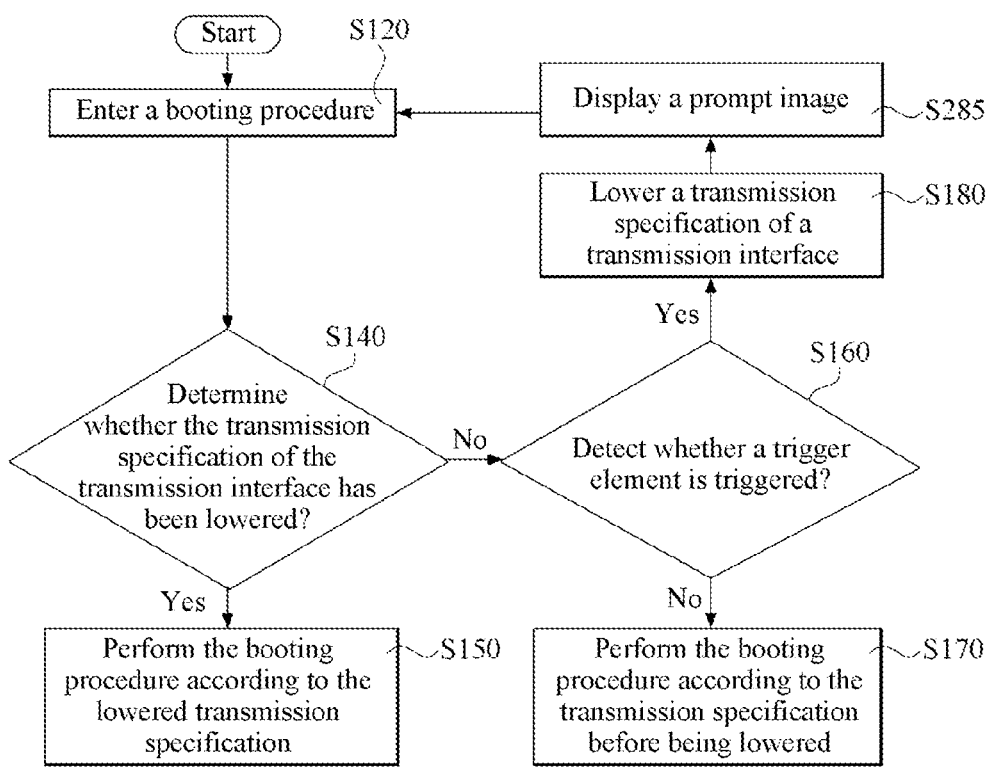
FIG. 3 is a flowchart of another embodiment of a booting method according to the disclosure.

FIG. 3 is a flowchart of another embodiment of a booting method according to the disclosure. The booting method is applicable to the computer system 10 shown in FIG. 1.

Compared with the booting method in FIG. 2, in the booting method of this embodiment, after step S180 of lowering the transmission specification of the transmission interface 122, step S285 of displaying a prompt image is performed, to inform the user that the transmission specification of the transmission interface 122 has been lowered. Then, with the lowered transmission specification, this process goes back to step S120 of reentering the booting procedure. Step S285 is performed by the processing unit 121 of the mainboard 12.

Other steps of this process are similar to those in the embodiment in FIG. 2, and details are not described herein.

Figure 4:
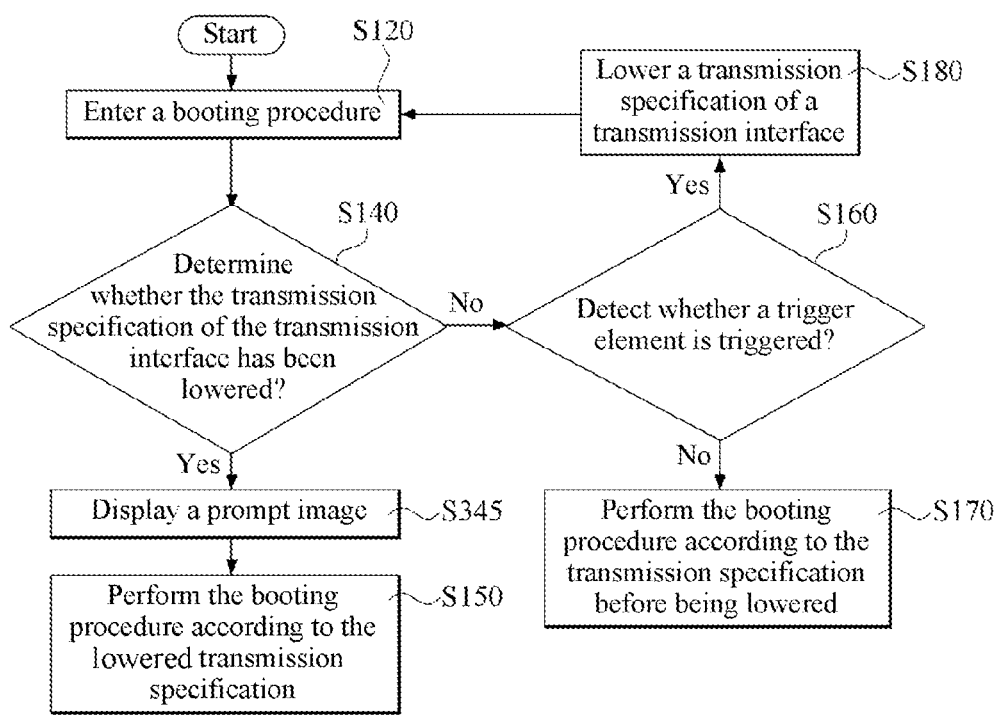
FIG. 4 is a flowchart of still another embodiment of a booting method according to the disclosure.

FIG. 4 is a flowchart of still another embodiment of a booting method according to the disclosure. The booting method is applicable to the computer system 10 shown in FIG. 1.

Compared with the booting method in FIG. 2, in the booting method of this embodiment, after step S140 of determining that the transmission specification of the transmission interface 122 has been lowered, step S345 of displaying a prompt image is performed, to inform the user that the transmission specification of the transmission interface 122 has been lowered. Then, this process goes to step S150 of continuing the booting procedure according to the lowered transmission specification. Step S345 is performed by the processing unit 121 of the mainboard 12.

Other steps of this process are similar to those in the embodiment in FIG. 2, and details are not described herein.

Conventionally, for the problem of no display caused by an unstable transmission interface between the mainboard and the graphics card or signal attenuation, the user needs to change a connection manner between the graphics card and the mainboard, or enter the BIOS to modify the settings of the graphics card. However, these operations are quite complex. By comparison, by using the computer system 10 and the booting method thereof provided in the disclosure, when there is no image displayed on a display, the user presses the trigger element 142 to display the graphics card 20 normally, thereby facilitating simplification of a debugging procedure of the user when the display fails to display normally.

The above are merely preferred embodiments of the disclosure, and do not constitute any limitation on the disclosure. Any form of equivalent replacements or modifications to the technical means and technical content disclosed in the disclosure made by a person skilled in the art without departing from the scope of the technical means of the disclosure still falls within the content of the technical means of the disclosure and the protection scope of the disclosure.

What is claimed is:

1. A booting method, applied to a computer system, the computer system comprising a transmission interface, a power key, and a trigger element, wherein the transmission interface comprises a transmission specification and is electrically connected to a graphics card, the power key is used for driving the computer system to perform a booting procedure, the booting method comprising:
   detecting, in the booting procedure, whether the trigger element is triggered; and
   lowering the transmission specification and restarting the computer system when the trigger element is triggered, wherein before the step of detecting whether the trigger element is triggered, the booting method further comprises determining whether the transmission specification has been lowered, and the step of detecting whether the trigger element is triggered is performed when determining that the transmission specification has not been lowered.

2. The booting method according to claim 1, wherein the transmission interface is a PCI-E interface.

3. The booting method according to claim 1, wherein the trigger element is a functional key, a switch, or a jumper.

4. The booting method according to claim 1, wherein the computer system comprises a basic input/output system (BIOS), and the transmission specification of the transmission interface is recorded in the BIOS.

5. The booting method according to claim 4, wherein the step of lowering the transmission specification of the transmission interface and restarting the computer system when the trigger element is triggered comprises:
   lowering settings of the transmission specification in the BIOS; and
   restarting the computer system according to the lowered transmission specification.

6. A computer system, comprising:
   a mainboard, comprising a transmission interface, the transmission interface comprising a transmission specification and being electrically connected to a graphics card;
   a trigger element, electrically connected to the mainboard; and
   a power key, electrically connected to the mainboard, and used for driving the computer system to perform a booting procedure, wherein
   the mainboard detects, in the booting procedure, whether the trigger element is triggered, and lowers the transmission specification and restarts when the trigger element is triggered, and
   before the mainboard detects, in the booting procedure, whether the trigger element is triggered, the mainboard determines whether the transmission specification has been lowered, and the mainboard detects whether the trigger element is triggered when the mainboard determines that the transmission specification has not been lowered.

7. The computer system according to claim 6, wherein the mainboard comprises an indicator light, for indicating a running state of the booting procedure.

8. The computer system according to claim 6, wherein the transmission interface is a PCI-E interface.

9. The computer system according to claim 6, wherein the mainboard comprises a basic input/output system (BIOS), and the transmission specification is recorded in the BIOS.

* * * * *